Figure 3:
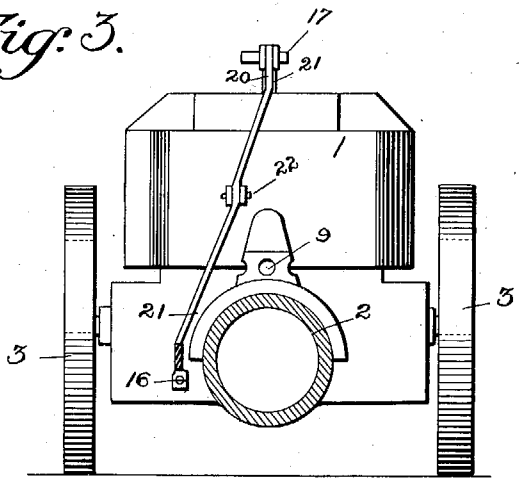

A. PALMROS.

PRESSURE DRIVEN RECIPROCATING TOOL.

APPLICATION FILED SEPT. 16, 1910.

Reissued Feb. 16, 1915.

13,882.

2 SHEETS—SHEET 1.

Witnesses

Jos. Hollis

William H. Knight Jr.

Inventor

Alexander Palmros,

By Knight Bros

Attorneys.

A. PALMROS.

PRESSURE DRIVEN RECIPROCATING TOOL.

APPLICATION FILED SEPT. 16, 1910.

Reissued Feb. 16, 1915.

13,882.

2 SHEETS—SHEET 2.

Witnesses

Jos. F. Collins

Collison H. Knight

Inventor

Alexander Palmros,

By Knight Bros.

Attorneys.

UNITED STATES PATENT OFFICE.

ALEXANDER PALMROS, OF SYRACUSE, NEW YORK, ASSIGNOR TO THE PNEUMELECTRIC MACHINE COMPANY, OF SYRACUSE, NEW YORK, A CORPORATION OF NEW YORK.

PRESSURE-DRIVEN RECIPROCATING TOOL.

13,882. Specification of Reissued Letters Patent. Reissued Feb. 16, 1915.

Original application filed November 25, 1905, Serial No. 289,127. Divided and application filed April 4, 1908, Serial No. 425,189. Original No. 937,009, dated October 12, 1909. Application for reissue filed September 16, 1910. Serial No. 582,616.

*To all whom it may concern:*

Be it known that I, ALEXANDER PALMROS, a citizen of Finland, and resident of Syracuse, in the county of Onondaga and State of New York, have invented certain new and useful Improvements in Pressure-Driven Reciprocating Tools, of which the following is a specification.

This application is a division of my application filed November 25, 1905, Serial No. 289,127, wherein I have described and claimed a fluid pressure driven percussion tool comprising a pair of suitably housed pistons connected respectively to the tool carrying shaft and the connecting rod of an actuating motor; the pistons being so related that the driving piston has retracting influence over the driven piston during that stroke of the machine in which the tool draws away from the work and at the same time said driving piston compresses a body of air which, at the end of the retracting stroke of the driven piston, is released and permitted to react upon the driven piston to drive it forward and deliver the working stroke. One of the methods disclosed in my said application for establishing retracting influence is by arranging for the expulsion of the body of driving air after completion of the working stroke and as the driving piston follows it forward and to admit air forward of the driven piston so that when the driving piston draws rearward, it will so far reduce the pressure in rear of the driven piston as to permit the pressure medium in front of it to drive the driven piston backward.

The object of my present invention is to develop a more effective force in front of the driven piston for the purpose of driving it rearward, and to these ends my present invention consists in supplying to the space in front of the driven piston, when the compressing piston executes its retracting stroke, a fluid medium under pressure, which may act against the driven piston to retract it; also in having this delivery of pressure in front of the driven piston to take place during the retracting stroke of the compressing piston, but independently of said compressing piston, so that it does not retract from the power which the latter develops and delivers to the driven piston on its working stroke. In the embodiment herein selected for purposes of illustration, the independent delivering means is supplied from the space between the pistons, during the forward stroke of the compressing piston, which expels the air from between the pistons into a space in which it is trapped for subsequent delivery to the forward face of the driven piston, so that the pressure medium thus employed is a portion of the fluid pressure that was utilized to drive the driven piston forward. By the delivery of a fluid medium under pressure to the forward side of the driven piston, it follows that as soon as a condition is developed in rear of the driven piston which will make the retracting pressure effective, said driven piston will be retracted positively and promptly and be in a position to receive the next forward driving stroke to the best advantage.

According to another aspect, my present invention consists in trapping or confining a portion of the actuating pressure medium in a pressure driven tool, while said medium is still at an effective density, and thereafter releasing said pressure medium against the forward face of the piston, after suitable reduction of the pressure on its driving face.

My present invention further consists in certain features of construction whereby the several objects of my invention are attained.

Figure 1:
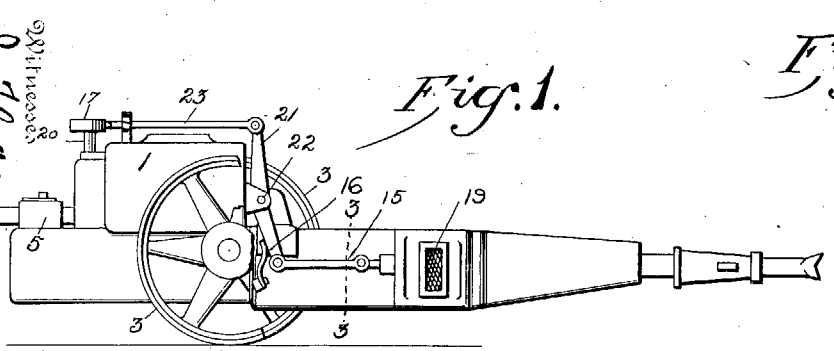
Figure 2:
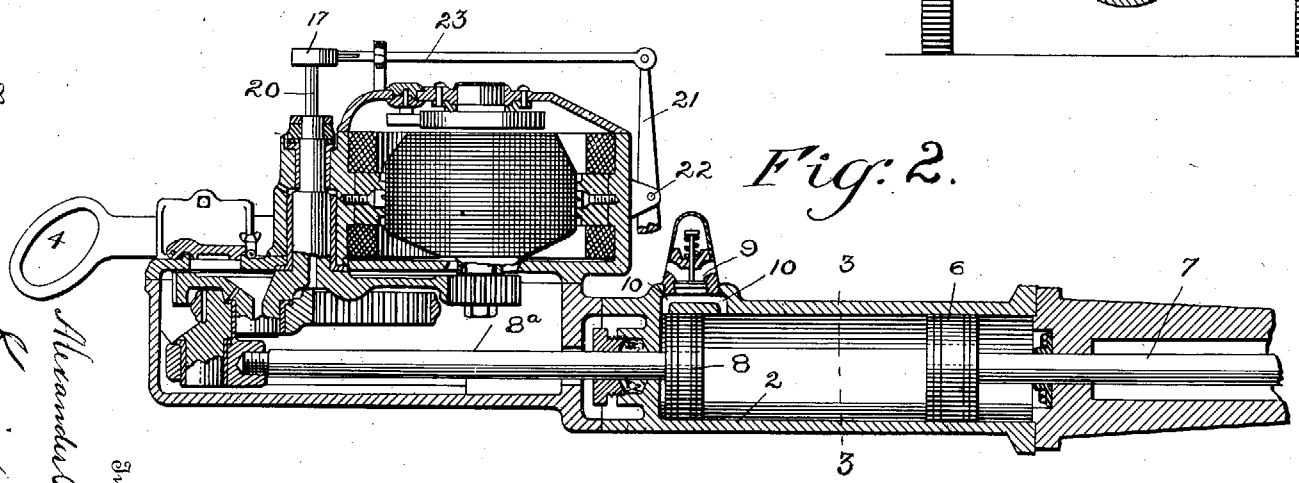
Figure 4:
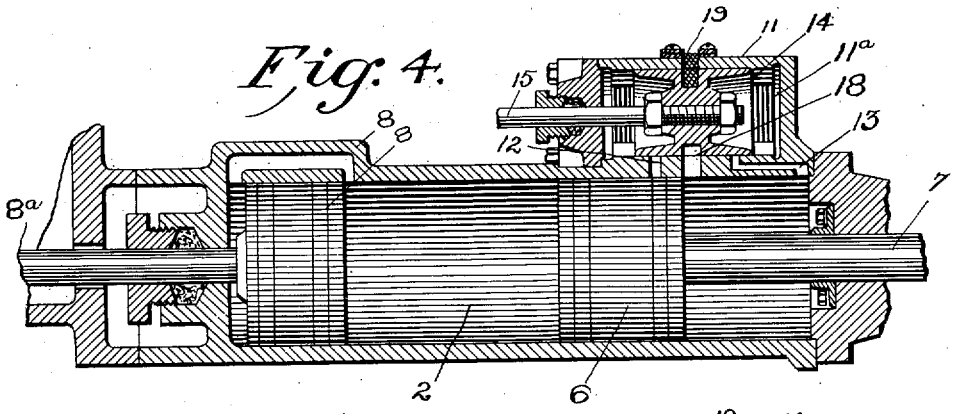
Figure 5:
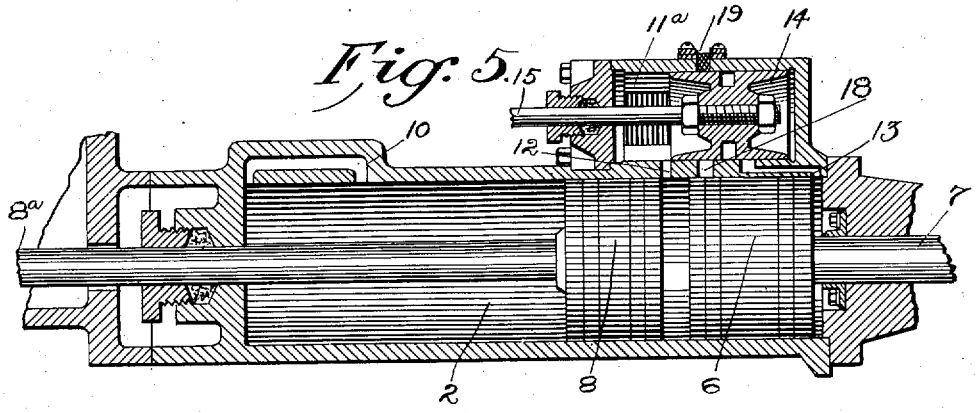
Figure 6:
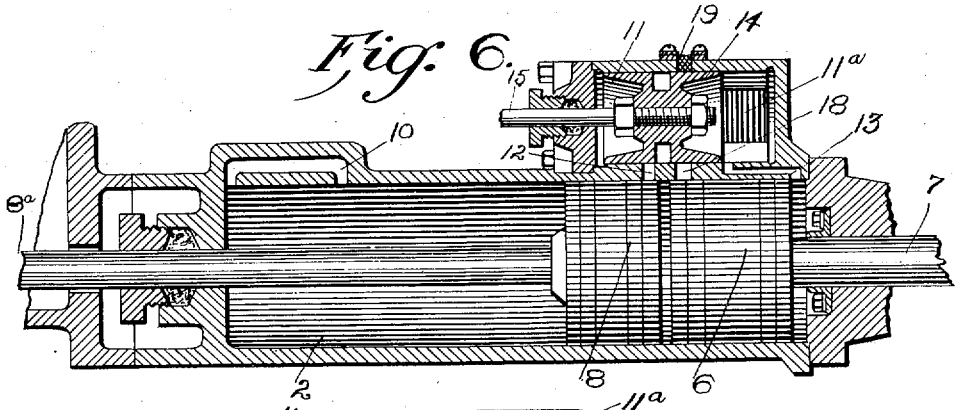
Figure 7:
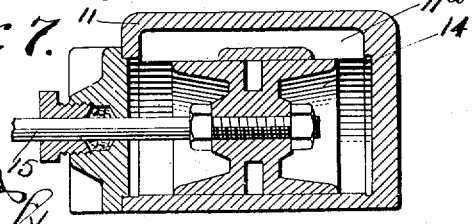

In the accompanying drawings, Figure 1 is a side elevation of an electropneumatic coal mining machine in which my present invention is embodied by way of illustration; Fig. 2 is a vertical longitudinal section of the machine shown in Fig. 1, in the plane of the axis of the cylinder; Fig. 3 is a transverse section on the line 3—3, Figs. 1 and 2; Figs. 4, 5 and 6 are longitudinal sections of the working cylinder and storing chamber in the plane of their axes, showing the pistons and the valve in different relative positions; and Fig. 7 is an axial section of the storage chamber and its valve taken in a plane at right angles to the plane of the sections shown in Figs. 4, 5 and 6.

1 represents the motor housing and 2 the piston housing or cylinder of an electropneumatic coal mining machine of the type selected for illustration of my present invention, which machine is usually mounted upon wheels 3 and is provided with controlling handles 4 and current controlling switch 5. As these parts have no special connection with my present invention, they need not be further described here.

By referring to Fig. 2, it will be seen that the cylinder 2 contains a driven piston 6 whose rod 7 is designed to receive and carry a suitable bit in a manner well known to those skilled in the art. In the type of machine selected for illustration of my invention, the piston 6 is acted upon expansively by a body of air which is compressed by the retracting stroke of a driving piston 8 which is housed in the same cylinder with the piston 6, said cylinder being provided with valved inlet port 9 through which a new body of air is drawn by each forward stroke of the piston 8, and a by-pass 10 through which said body of air can escape to the space between the pistons 8 and 6, after the body of air has been compressed by the rearward movement of the piston 8 to a position between the ends of said by-pass. During the retracting stroke of the piston 8, the piston 6 is also moved rearward by what we may term the suction of the piston 8, that is to say by atmospheric or other pressure acting upon the forward face of piston 6 simultaneously with the rarefaction of air between the pistons due to the rearward movement of piston 8 from the position shown in Fig. 6. For some purposes it will be sufficient, for retracting piston 6, to simply admit atmospheric air in front of said piston as the piston 8 moves rearward. But according to my present invention, I desire to secure a more positive retracting movement of the piston 6 than is attainable by the mere admission of atmospheric air in front of said piston at the time the air is being rarefied behind it; for which purpose, I provide means such as a valve housing 11 the two ends of which act as a single storage space by reason of their communication through by-pass 11ª (see particularly Fig. 7) for receiving a portion of the pressure medium (see Fig. 5) which drove the piston 6 forward (Figs. 2 and 4) on its preceding stroke, and delivering (Fig. 6) it in front of said piston 6 at the time when it is desired to drive said piston rearward. For this purpose, housing 11 communicates through a port 12 with the cylinder 2 at a point that is in rear of piston 6 when the latter reaches its forward limit (Fig. 5), and also through a port 13 at a point forward of the forward limit of said piston 6, so that the driving pressure medium for the piston 6 may pass into the housing 11 after the piston has received the necessary forward impulse and pass from said housing in front of the piston (Fig. 6); in other words, the housing forms a by-pass around the driven piston at the forward end of the cylinder.

To time the delivery of the pressure medium from the housing 11 to the front face of the piston 6, said housing is provided with a valve 14 controlled by a valve stem 15 which is moved in one direction by a spring 16 and in the other direction by a constantly rotating cam 17. While the piston 6 controls the port 12 of housing 11, it is preferable to have the valve 14 so positioned that it will regulate the opening of said port. It is also preferable to have the valve 14 control an exhaust port 18 (Fig. 4), which discharges into atmosphere at 19. The cam 17 may be conveniently mounted upon the shaft 20 of the motor gear so that it rotates constantly. It is so designed that it will move valve 14 to the position shown in Fig. 5 immediately after the piston 6 reaches its forward limit, and hold it there until piston 8 reaches its forward limit, when the housing 11 will have been charged with air under considerable pressure. Then cam 17 moves valve 14 to close the port 12 and the exhaust port 18 and open port 13 (Fig. 6), which occurs at the time piston 8 starts rearward. This releases the pressure medium in the forward end of housing 11 through by-pass 11ª and port 13 to the space in front of the piston 6 and drives the latter rearward, as air is exhausted behind it, with much greater force than if atmosphere alone were depended upon. As soon as the retraction is nearly complete or has developed sufficiently to insure completion by the momentum of the parts, cam 17 moves valve 14 to an intermediate position (Fig. 4), at which it opens the exhaust 18—19, so as to avoid resistance to the forward movement of piston 6.

The rod 15 is not connected directly with the cam, but for convenience is connected to a lever 21, fulcrumed at 22, which is in turn brought under the influence of the cam through the medium of the push rod 23. As these details are not of the essence of my invention, they may obviously be modified at will and according to circumstances.

It is to be understood that the piston 8 is constantly reciprocated through its rod 8ª by power received from any suitable source, as for instance, an electric motor located in the motor housing 1. I do not limit myself, however, to any specific means for imparting reciprocation to the piston 8.

The following steps will be observed during the operation of the apparatus: I. As soon as the blow has been delivered by piston 6, which is shown in its foremost position in Fig. 5, and only a moment thereafter, valve 14 arrives in the position shown in this figure, thereby opening port 12; while piston 8 is still advancing compressing air into chamber 11. II. Valve 14 runs rearward into position shown in Fig. 6, thereby closing port 12 and opening port 13; while piston 8 is on the point of reversing, and piston 6 starting toward the rear.

III. During the back stroke of piston 8, piston 6 follows, while valve 14 remains stationary. IV. Before piston 8 has opened the forward end of the by-pass 10, valve 14 is moved into the position shown in Fig. 4, connecting the forward end of the cylinder 2 with the atmosphere through ports 18 and 19. V. With the valve 14 remaining in this position, piston 8, still retracting, opens the forward end of port 10, thereby delivering pressure against the rear side of piston 6 sending the latter forward, air escaping through exhaust ports 18 and 19. Piston 8 now reverses; but not until piston 6 has delivered its blow, does valve 14 move forward into the first position shown in Fig. 5, piston 8 in the meantime going forward.

I claim:—

1. A percussion implement having a casing, a pressure-driven piston housed therein and receiving the pressure-medium on one face to develop an impulse therein, a second piston similarly housed in said casing for compressing said pressure-medium during the retraction of the pistons and recompressing said pressure medium in said casing after the driven piston has completed its forward stroke, and mechanically controlled means for conducting a portion of the pressure-medium which developed the impulse to the opposite face of the driven piston and to trap and to release compressed air in front of the driven piston.

2. A percussion implement having a casing, a pressure driven piston housed therein and receiving the pressure medium on one face to develop an impulse therein, a second piston similarly housed in said casing for compressing said pressure-medium during the retraction of the pistons and recompressing said pressure medium in said casing after the driven piston has completed its forward stroke, and means including a port for passing a portion of the pressure medium to the opposite face of the driven piston and to trap and to release compressed air in front of the driven piston.

3. A percussion implement having a suitably housed pressure-driven piston receiving a pressure medium on one face to develop an impulse therein, means compressing said pressure medium and means trapping a portion of said medium under pressure and thereafter releasing it against the forward face of the piston.

4. The combination of suitably housed driving and driven pistons having opposed faces; means whereby the driving piston compresses a fluid on its rear face on one stroke, and the fluid under pressure thus developed is delivered between the opposed faces of the pistons to develop an impulse in the driven piston, and means delivering a portion of said fluid under pressure to the forward face of the driven piston, and exhausting the same therefrom when expanded.

5. In a fluid pressure driven tool the combination of driving and driven pistons, of which the driving piston exerts retracting influence over the driven piston, a common housing for said pistons closed at both ends, said driving piston developing therein the projecting force for said driven piston at the rear end of said housing, a by-pass in said housing for controlling said projecting force between said pistons, means for actuating said driving piston, and means independent of the driven piston for delivering a projecting force forward of the driven piston while the driving piston is exerting its retracting influence, and exhausting the same therefrom when expanded, said second projecting force being developed during the latter part of the forward stroke of said driving piston.

6. A machine of the class described comprising independently reciprocable tool-operating and fluid-compressing pistons, a cylinder in which said pistons are fitted, providing a tight compressing chamber in rear of the compressing piston, and an expansion chamber between the pistons, said cylinder also having a by-pass adapted to conduct fluid from said compression chamber to said chamber between the pistons, means for compressing said fluid and conducting the same fluid under pressure to the front of the tool operating piston for retracting said piston, and means for exhausting said fluid in advance of the tool operating piston, whereby the percussion stroke of the tool operating piston is developed by the expansive action of the pressure fluid medium.

7. The combination with a driving compression piston and a driven piston, of a cylinder casing wherein both of said pistons are suitably housed, and a by-passage forming communication between the controlling face of the driven piston and the compression space of the driving piston, through which a medium compressed during such retraction is communicated to the driven piston, said cylinder casing providing means through which fluid under pressure is conducted to the forward side of the driven piston whereby the driven piston is retracted during the compression stroke of the driving piston, and means having intercommunication with said first means through which the fluid medium is displaced after the advance of the driven piston.

8. A machine of the class described comprising a casing provided with a cylinder, tool operating and fluid-compressing pistons independently reciprocable therein, the casing being provided with a by-pass having ports for conducting compressed fluid from one side of the compressing piston to a space between the latter piston and the tool operating piston, and means for recompressing and conducting said fluid to the forward side of the tool operating piston for retracting the latter.

9. In a fluid pressure driven tool the combination of a driving piston and a driven piston, a suitable housing for said pistons closed at both ends, said driving piston exerting retracting influence over the driven piston, and compressing a pressure medium at the rear end of the housing, means for actuating said driving piston, and a by-pass in said housing for delivering said pressure medium between the pistons, said driving piston compressing said pressure medium on its forward stroke, means for trapping said pressure medium after the forward stroke of the driving piston and delivering it under pressure forward of the driven piston, while said driving piston is exerting its retracting influence and exhausting said pressure medium when expanded.

10. In a fluid pressure driven tool the combination of a driving piston and a driven piston, a suitable housing for said pistons closed at both ends, said driving piston exerting retracting influence over the driven piston and compressing a pressure medium at the rear end of the housing, means for actuating said driving piston and a by-pass in said housing for delivering said pressure medium between the pistons, said driving piston compressing said pressure medium on its forward stroke, means for trapping a portion of said pressure medium after the forward stroke of the driving piston and delivering said pressure medium forward of the driven piston while said driving piston is exerting its retracting influence and exhausting said pressure medium therefrom when expanded.

11. In a fluid pressure driven tool the combination of a driving piston and a driven piston of which the driving piston develops pressure in a fluid on its rearward stroke, a common housing for both pistons, means delivering said fluid under pressure to the rear face of the driven piston to develop a forward impulse therein, a chamber into which said fluid driving medium is forced by the forward stroke of the driving piston, a trap and means delivering said fluid from said chamber to the space in front of the driven piston to exert retracting influence on said driven piston, and exhausting said fluid therefrom when expanded.

12. In a fluid pressure driven tool the combination of a driving piston and a driven piston of which the driving piston exerts retracting influence over the driven piston, in addition to developing the projecting force therefor, a suitable common housing for both pistons, means for actuating said driving piston, means delivering to the rear face of said driven piston a fluid under pressure developed by said driving piston, and means independent of the driving piston delivering said fluid medium under pressure, forward of the driven piston while the driving piston is exerting its retracting influence, an exhaust port, opening communication with the space in front of the driven piston during its forward stroke.

13. In a fluid pressure driven tool the combination of a driving piston, a driven piston, a housing for said pistons, and means comprising a pressure chamber for receiving a portion of the pressure medium previously delivered to the rear face of said driven piston and now recompressed by said driving piston, and communicating the same pressure medium to the forward face of said driven piston for driving it rearward, and means for exhausting said medium therefrom when expanded.

14. In a fluid pressure driven tool the combination of a driving piston, a driven piston receiving a fluid under pressure on its rear face to drive it forward, a common housing for both pistons, and means comprising a pressure chamber for receiving a portion of the pressure medium which is being recompressed by said driving piston as said driven piston approaches its forward limit, and communicating the same pressure medium to the forward face of said driven piston for driving it rearward, and means for finally exhausting said medium therefrom when expanded.

15. The combination of a driving piston, a driven piston, a housing for said pistons, a chamber in said housing to the rear of said driving piston wherein driving pressure medium is compressed by said driving piston, a by-pass from said chamber to the pressure side of said driven piston and an inlet valve in said by-pass; a valve chamber communicating with the housing of said pistons at a point in rear of the forward position of the driven piston and also at a point forward of said position, whereby said valve chamber receives a portion of said driving pressure medium when compressed by the forward movement of said driving piston, and a valve controlling said reception of said driving pressure medium in said chamber, as well as the delivery of said pressure medium to the cylinder forward of said piston and an exhaust port for the expanded pressure medium.

16. The combination of a driven piston, a housing for said piston, a valve chamber communicating with the housing of said piston at a point in rear of the forward limit of the piston and also at a point forward of said limit, whereby said valve chamber receives a portion of the driving pressure medium, and a valve controlling the delivery of said pressure medium to the cylinder forward of said piston, said valve also controlling said communication in rear of said limit and closing the same till the driven piston has passed.

17. In a fluid pressure driven tool, the combination of a cylinder, a driven piston therein, a valve chamber having communication with the cylinder at a point in rear of the forward limit of the piston and also at a point forward of the said limit, and having an exhaust port; and a valve controlling said communications and exhaust port; said valve opening the cylinder to exhaust during the forward stroke of the piston, admitting driving pressure fluid to the chamber from the cylinder in rear of the driven piston, and then delivering said pressure fluid to the cylinder forward of said piston.

18. In a fluid pressure driven tool, the combination of compressing and driven pistons, a suitable housing for said pistons, a passage in the rear end of said housing, a valve mechanism to trap the compressed fluid medium and a chamber for said valve communicating with the housing both forward and rearward of the forward position of the driven piston, said compressing piston during its rearward stroke both exhausting the air behind the driven piston and compressing a fluid medium at the rear end of said housing while at the forward stroke of the compressing piston the driven piston receives through said passage the medium thus compressed and is driven forward by the same, said chamber receiving a portion of the pressure medium used to drive the driven piston forward, when the compressing piston moves forward, and delivering said pressure medium forward of the driven piston, to drive the latter rearward when the air is exhausted from the rear of said driven piston during the retracting stroke of the compressing piston.

19. In a fluid pressure driven tool, the combination of driving and driven pistons, a suitable housing for both pistons, a motor actuating the driving piston, a chamber receiving driving pressure medium from the rear of said driven piston and supplying it to the front thereof, to drive it rearward, a valve in said chamber for opening and closing the communications between the piston housing and the chamber, and driving connection between said valve and a shaft of the motor.

20. In a fluid-pressure driven tool, a working piston, a cylinder in which said piston works and in which it is subjected to fluid pressure on its rear face to develop its working stroke, means for compressing said fluid, a valve mechanism to trap the fluid pressure medium, and a chamber for said valve mechanism having a port through which it communicates with the cylinder and receives said fluid under pressure therefrom upon being recompressed by said fluid compressing means, and having an outlet port for exhausting the air in front of the piston on its forward stroke and a port communicating with and transmitting said fluid under pressure to the forward face of said piston to drive it rearward.

21. In a fluid-pressure driven tool, a working piston, a cylinder in which said piston works and in which it is subjected to fluid pressure on its rear face to drive it forward and develop its working stroke, and a chamber having suitably controlled ports through which it communicates with said cylinder, both in rear and forward of the said piston, and through which it receives therefrom, under pressure, a part of the fluid that drives the piston forward and returns said fluid under pressure to the forward face of said piston to drive it rearward.

22. In a fluid-pressure driven tool, a working piston, a cylinder in which said piston works and in which it is subjected to fluid pressure on its rear face to drive it forward and develop its working stroke, and a chamber having suitably controlled ports communicating with said cylinder, both in front and in rear of the forward limit of said piston, and receiving fluid under pressure from said cylinder in rear of said piston, and returning said fluid under pressure to said cylinder forward of said piston, to drive the piston rearward; means being provided to time the opening of such communications.

23. In a fluid-pressure driven tool, a fluid-pressure driven working piston, a cylinder in which said piston works and in which it is subjected on its rear face to the expansive action of the fluid pressure medium, to drive it forward and develop its working stroke, a chamber for storing the fluid medium under pressure, having suitably controlled ports communicating with said cylinder, through which it receives fluid medium under pressure therefrom, and returns said fluid under pressure to the forward face of said working piston to drive it rearward, means to exhaust the fluid pressure medium from the front side of the driven piston, and a suitably housed pressure-developing piston, supplying said fluid-medium under pressure.

24. In a fluid-pressure driven tool, a fluid pressure driven working piston, a cylinder in which said piston works and in which it is subjected on its rear face to the expansive action of a fluid pressure medium, to drive it forward and develop its working stroke, a chamber for storing the fluid medium under pressure, having suitably controlled ports communicating with said cylinder, through which it receives fluid medium under pressure therefrom, and returns said fluid under pressure to the forward end of said working piston to drive it rearward, and a suitably housed pressure-developing piston, supplying means to exhaust the fluid pressure medium from the front side of the driven piston, said fluid-medium under pressure compressing the pressure medium on one stroke and on the other stroke forcing said medium, under pressure, into the storage chamber.

25. In a fluid-pressure driven tool, a fluid-pressure driven working piston, a cylinder in which said piston works and in which it is subjected on its rear face to the expansive action of a fluid pressure medium, to drive it forward and develop its working stroke, a chamber for storing the fluid medium under pressure, having suitably controlled ports communicating with said cylinder, through which it receives fluid medium under pressure from said cylinder, and returns said fluid under pressure to the forward end of said working piston to drive it rearward, means to exhaust the fluid pressure medium from the front side of the working piston, a passage way for the pressure medium and a pressure-developing piston also in said cylinder supplying said fluid-medium under pressure compressing the pressure medium and releasing it by means of said passageway into the space between the pistons on one stroke and on the other stroke forcing a portion of said medium, under pressure, into the storage chamber.

26. In a fluid-pressure driven tool, a fluid-pressure driven working piston, a cylinder in which said piston works and in which it is subjected to fluid pressure on its rear face to drive it forward and develop its working stroke, a chamber communicating with said cylinder, receiving fluid under pressure therefrom, a valve mechanism to trap said compressed fluid medium in said chamber, and returning said fluid under pressure to the forward face of said piston to drive it rearward, a motor-driven compressing piston also working in said cylinder, compressing a charge of fluid on its rearward stroke, there being means for delivering said charge under pressure thus developed, to the space between the pistons, whereby it drives the pressure-driven piston forward by its expansion, the expanded pressure medium in front of the driven piston being simultaneously exhausted and said compressing piston thereafter following the pressure-driven piston forward, to introduce a new charge in rear of said compressing piston and displace pressure medium from between the pistons into the chamber.

27. In apparatus of the class described, the combination with a reciprocatory gas-driven member carrying a tool, of a reciprocatory gas compressor associated therewith, and means for delivering the compressed gas to actuate said tool member, a cylinder in which said member and said gas compressor work, a port in said cylinder communicating with the atmosphere and a positively driven associated valve-mechanism, adapted intermittently to open to the atmosphere by means of said port, the space in said cylinder in advance of the driven member to permit reciprocation of the driven tool member.

28. In apparatus of the class described, the combination with a reciprocatory gas-driven member carrying a tool, of a reciprocatory gas compressor associated therewith, a cylinder closed at both ends wherein said member and said compressor work, a by-pass in said cylinder for transmitting the compressed gas from the pressure side of said gas compressor to the space between said compressor and said gas driven member for the purpose of acting on the latter, a port in said cylinder adapted to communicate with the atmosphere, and a positively driven associated valve-mechanism with a chamber therefor, adapted intermittently to open to the atmosphere, by means of said port, the space in advance of the driven member and close such space during the retracting thereof to permit reciprocation of the driven member, a receiving port transmitting the compressed gas into said chamber and a delivering port transmitting gas from said chamber to the front of said member for retracting it, said receiving and delivering ports being controlled by said valve mechanism and said gas being recompressed by said compressor before entering the chamber.

29. A machine of the class described comprising a cylinder closed at both ends, tool-operating and fluid-compressing pistons reciprocable in said cylinder, and ports for conducting compressed fluid from one side of one of said pistons to a space between said pistons, said fluid compressing piston adapted to actuate said tool operating piston through the fluid, said machine being provided with a valve controlled chamber permanently closed to the atmosphere and having means for transmitting fluid recompressed by said compressing piston to the tool operating side of said tool-operating piston, and said machine also having a valve controlled fluid exhaust port.

30. A machine of the class described comprising a cylinder closed at both ends and tool operating fluid pressure driven piston, and a fluid compressing piston adapted to actuate said driven piston by means of the fluid, and reciprocable in said cylinder, said machine also having ports controlled by said fluid compressing piston for conducting compressed fluid from the compressing side of the compressing piston to a space between said pistons; said machine being provided with a valve controlled chamber permanently closed to the atmosphere and having means for conducting fluid recompressed by said compressing piston from the space between the pistons to the space forward of the fluid pressure driven piston.

31. A machine of the class described comprising a cylinder closed at both ends, tool operating and fluid compressing pistons reciprocable in said cylinder, said machine having ports for conducting compressed fluid from the pressure side of the fluid compressing piston to the space between said pistons to actuate said tool operating piston, means permanently closed to the atmosphere for conducting fluid to the tool operating piston for retracting the latter, an exhaust port for the expanded fluid, and positively driven valve mechanism controlling said fluid conducting means and said exhaust port.

32. A machine of the class described comprising a casing provided with a cylinder closed at both ends, tool operating and fluid compressing pistons reciprocable therein, said machine having ports for conducting compressed fluid from the pressure side of the compressing piston to the space between the latter piston and the tool operating piston to actuate said tool operating piston, means permanently closed to the atmosphere for conducting fluid to the tool operating piston for retracting the latter, an exhaust port for the expanded fluid, and positively driven valve mechanism controlling said fluid conducting means and said exhaust port.

33. A machine of the class described comprising a cylinder closed at both ends air compressing and tool operating pistons reciprocable in said cylinder, a by-pass at one end of said cylinder, having ports controlled by said compressing piston, said compressing piston adapted to actuate said tool operating piston by means of air compressed by said compressing piston at said end of the cylinder and transferred to the inter-piston space; and a valve controlled chamber with ports for transmitting air recompressed by said compressing piston from the inter-piston space to the outer face of the tool operating piston.

34. A machine of the class described comprising a cylinder, air compressing and tool-operating pistons reciprocable in said cylinder, a by-pass at the rear end of the cylinder, by means of which by-pass the air compressed at said rear end by the compressing piston is respectively communicated to the inter-piston space from the outer face of said compressing piston thereby actuating said tool-operating piston, said by-pass being controlled by said compressing piston, a chamber with ports at the forward end of said cylinder and a valve in said chamber for controlling said ports, said cylinder also having at its respective ends controlled ports communicating with the atmosphere.

35. A machine of the class described comprising a cylinder, air compressing and tool operating pistons reciprocable in said cylinder, a by-pass at the rear end of said cylinder by means of which by-pass the air compressed at said rear end by the compressing piston is respectively communicated to the inter-piston space from the outer face of said compressing pistons, thereby actuating said tool operating piston, and from said inter-piston space to the outer face of said tool operating piston, said by-pass being controlled by said compressing piston, a chamber with ports at the forward end of said cylinder and a valve in said chamber for controlling said ports, said cylinder having valve controlled air inlet and exhaust ports at its respective ends.

36. A machine of the class described comprising a cylinder, a tool operating fluid pressure driven piston and a fluid compressing piston independently reciprocable in said cylinder, and means being provided for conducting compressed fluid from the compressing side of the compressing piston to a space between said pistons, a valve housing secured to the cylinder, and provided with a by-pass and exhaust port, independently driven means located within the housing and adapted to regulate communication through the by-pass and exhaust port, the said by-pass being adapted to conduct fluid compressed in the space between the pistons and deliver it to the space forward of the fluid pressure-driven piston.

37. In a device of the character described, the combination of a pressure cylinder, a tool piston, means for supplying atmospheric air to the rear end of said cylinder, means for compressing the same for effecting the working stroke of the piston and carrying the effective pressure of said compressed air to the tool end of said cylinder, means for trapping air compressed by said compressing means at the tool end of said cylinder and releasing said air for assisting in retracting said piston during the major portion of the return stroke of the tool piston.

The foregoing specification signed at Syracuse, N. Y. this 19th day of August 1910.

ALEXANDER PALMROS.

In presence of—
C. Grace Kentner,
Eva Cirtwill.